United States Patent
Roques et al.

(10) Patent No.: US 12,330,668 B2
(45) Date of Patent: Jun. 17, 2025

(54) TORQUE REQUEST MODIFICATION STRATEGIES FOR VEHICLES

(71) Applicant: JAGUAR LAND ROVER LIMITED, Coventry (GB)

(72) Inventors: Olivier Roques, Banbury (GB); Manuel Vilaboy, Coventry (GB); Matthew Sullivan, Hinckley (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 279 days.

(21) Appl. No.: 17/920,770

(22) PCT Filed: Apr. 27, 2021

(86) PCT No.: PCT/EP2021/060981
§ 371 (c)(1),
(2) Date: Oct. 21, 2022

(87) PCT Pub. No.: WO2021/214347
PCT Pub. Date: Oct. 28, 2021

(65) Prior Publication Data
US 2023/0339489 A1 Oct. 26, 2023

(30) Foreign Application Priority Data
Apr. 21, 2020 (GB) .................................... 2005816

(51) Int. Cl.
*B60W 50/08* (2020.01)
*B60W 20/10* (2016.01)

(52) U.S. Cl.
CPC .......... *B60W 50/087* (2013.01); *B60W 20/10* (2013.01); *B60W 2510/084* (2013.01); *B60W 2520/30* (2013.01)

(58) Field of Classification Search
CPC ............... B60W 50/087; B60W 20/10; B60W 2510/084; B60W 2520/30; B60W 30/025;
(Continued)

(56) References Cited

U.S. PATENT DOCUMENTS

2002/0105188 A1* 8/2002 Tomikawa ......... B60K 23/0808
290/40 C
2005/0060079 A1* 3/2005 Phillips ................... B60K 6/48
701/53
(Continued)

FOREIGN PATENT DOCUMENTS

CN 110303899 A 10/2019
DE 102015015691 A1 6/2017
(Continued)

OTHER PUBLICATIONS

PCT International Search Report corresponding to International Application No. PCT/EP2021/060981, dated Aug. 6, 2021, 5 pages.
(Continued)

*Primary Examiner* — Donald J Wallace
*Assistant Examiner* — Jalal C Coduroglu
(74) *Attorney, Agent, or Firm* — TROUTMAN PEPPER LOCKE LLP; Dustin B. Weeks; Carter B. Hale

(57) ABSTRACT

Aspects of the present invention relate to a control system and to a method of controlling a total driven wheel torque for a vehicle by controlling torque output of a first torque source of the vehicle and of a second torque source of the vehicle, wherein the first torque source is configured to provide drive torque to a first axle of the vehicle for generating first axle wheel torque, wherein the second torque source is configured to provide drive torque to a second axle of the vehicle for generating second axle wheel torque, the method comprising: receiving a total torque request for total driven wheel torque; producing a first torque request for the first
(Continued)

torque source and a second torque request for the second torque source, in dependence on the total torque request for the total driven wheel torque; and when at least one of the first and second torque requests is not satisfiable, modifying at least one of the first and second torque requests to enable a sum of the first axle wheel torque and the second axle wheel torque to approach or satisfy the total torque request, wherein the modification of at least one of the torque requests is controlled by at least one torque rate modifier configured to increase or decrease a rate of change of at least one of the torque requests.

20 Claims, 6 Drawing Sheets

(58) Field of Classification Search
CPC ............... B60W 30/18; B60W 30/188; B60W 2510/0657; B60W 2510/0661; B60W 2510/083; B60W 2710/0666; B60W 2710/0672; B60W 2710/083; B60W 2710/085; B60W 10/06; B60W 10/08; B60W 20/17; Y02T 10/62; B60K 6/485; B60K 6/52; B60K 2006/268; B60K 6/448
See application file for complete search history.

(56) References Cited

U.S. PATENT DOCUMENTS

| | | | | |
|---|---|---|---|---|
| 2009/0112385 A1* | 4/2009 | Heap | ...................... | B60K 6/445 180/65.21 |
| 2009/0234551 A1* | 9/2009 | Aswani | ................. | B60W 30/02 701/70 |
| 2012/0323401 A1* | 12/2012 | McGrogan | ............ | B60W 10/08 701/1 |
| 2013/0035838 A1 | 2/2013 | Maier | | |
| 2013/0211640 A1* | 8/2013 | Maier | ................. | B60K 23/0808 180/65.265 |
| 2013/0296106 A1* | 11/2013 | Dai | ........................ | B60W 10/02 903/902 |
| 2014/0257613 A1* | 9/2014 | Tang | ..................... | B60W 10/08 701/22 |
| 2015/0066333 A1* | 3/2015 | Butcher | .................. | F02D 29/02 701/102 |
| 2015/0120106 A1* | 4/2015 | Yu | ............................ | B60K 6/52 701/22 |
| 2018/0128198 A1* | 5/2018 | Cribbins | .............. | F02D 41/0087 |
| 2018/0339698 A1* | 11/2018 | Höck | .................... | B60W 10/08 |
| 2019/0023256 A1* | 1/2019 | Khafagy | ............... | B60W 30/02 |
| 2020/0039503 A1* | 2/2020 | Bowman | ............... | B60W 20/15 |
| 2020/0370611 A1* | 11/2020 | Bramson | ................ | B60K 6/445 |
| 2021/0078581 A1* | 3/2021 | Velazquez Alcantar | ..................... | B60L 3/10 |

FOREIGN PATENT DOCUMENTS

| | | |
|---|---|---|
| FR | 2955548 A1 | 7/2011 |
| GB | 2544763 A | 5/2017 |

OTHER PUBLICATIONS

PCT Written Opinion of the International Searching Authority corresponding to International Application No. PCT/EP2021/060981, dated Aug. 6, 2021, 7 pages.

Patents Act 1977: Combined Search and Examination Report under Sections 17 and 18(3) corresponding to Great Britain Application No. GB2005816.0, dated Sep. 8, 2020, 7 pages.

* cited by examiner

TORQUE REQUEST MODIFICATION STRATEGIES FOR VEHICLES

TECHNICAL FIELD

The present disclosure relates to torque request modification strategies for vehicles. In particular, but not exclusively it relates to torque request modification strategies for hybrid vehicles comprising different torque sources having different torque response capabilities.

BACKGROUND

An all-wheel drive hybrid vehicle architecture may comprise different torque sources driving different axles of a vehicle. For example, the torque sources may comprise an engine and an electric machine respectively, or two electric machines.

In some situations, the torque of a torque source may become "off-target" relative to its torque request. The torque is then controlled to recover at a high rate so that the torque becomes "on-target". In the above hybrid vehicle architecture, the torque recovery is difficult to control while satisfying various torque constraints.

SUMMARY OF THE INVENTION

It is an aim of the present invention to address one or more of the disadvantages associated with the prior art.

Aspects and embodiments of the invention provide a control system, a system, a vehicle, a method, and computer software as claimed in the appended claims.

According to an aspect of the invention there is provided a control system for controlling a total driven wheel torque for a vehicle by controlling torque output of a first torque source of the vehicle and of a second torque source of the vehicle, wherein the first torque source is configured to provide drive torque to a first axle of the vehicle for generating first axle wheel torque, wherein the second torque source is configured to provide drive torque to a second axle of the vehicle for generating second axle wheel torque, the control system comprising one or more controllers, wherein the control system is configured to: receive a total torque request for total driven wheel torque; produce a first torque request for the first torque source and a second torque request for the second torque source, in dependence on the total torque request for the total driven wheel torque; and when at least one of the first and second torque requests is not satisfiable modify at least one of the first and second torque requests to enable a sum of the first axle wheel torque and the second axle wheel torque to approach or satisfy the total torque request, wherein the modification of at least one of the torque requests is controlled by at least one torque rate modifier configured to increase or decrease a rate of change of at least one of the torque requests.

An advantage is an efficient and effective method of enabling the torque sources to compensate for shortfalls in each others torque or their combined torque when attempting to fulfill between them a total torque request.

The modification of at least one of the torque requests may comprise modifying the first torque request and modifying the second torque request.

The modification of at least one of the torque requests may be in dependence on a wheel torque response capability of at least one of the first torque source and the second torque source. A wheel torque response capability defines a maximum rate at which a torque source can change its torque as measured at the vehicle wheels.

One of the first and second torque sources may have a faster wheel torque response capability than the other.

When both the first and second torque requests are not satisfiable, the control system may be configured to: control the modification of at least one of the first and second torque requests to enable an increased rate of torque change from the one of the first and second torque sources having a greater wheel torque response capability, relative to the other of the first and second torque sources.

When one of the first and second torque requests, but not the other, is satisfiable, the control system may be configured to: control the modification of at least one of the torque requests to enable an increased rate of torque change from the one of the first and second torque sources that satisfies its corresponding torque request. This enables the torque source which is on-target (typically the more responsive of the two) to momentarily compensate for the shortcomings of the off-target torque source that cannot respond quickly enough.

When the first and second torque requests are changing in opposite directions and at least one of the corresponding torque requests is not satisfiable, the control system may be configured to: control the modification of at least one of the torque requests to cause a reduction of torque rate from the torque source having a faster wheel torque response capability.

The at least one torque rate modifier may comprise a first torque rate modifier for the first torque source and a second torque rate modifier for the second torque source, wherein controlling a torque shaping function comprises enabling relative variation of the first torque rate modifier and the second torque rate modifier.

A sum of rate limits specified by the first torque rate modifier and the second torque rate modifier may be configured to match a target combined torque rate modifier, to enable the sum of the first axle wheel torque and the second axle wheel torque to approach or satisfy the total torque request.

When both of the first and second torque requests are not satisfiable, the relative variation may be dependent on the relationship: $MTS_{Prim} = MTS_{Total} \cdot (s)$; and $MTS_{Secnd} = MTS_{Total} \cdot (1-s)$; wherein MTS refers to a torque rate modifier, wherein Prim refers to a primary one of the first and second torque sources, wherein Secnd refers to a secondary one of the first and second torque sources, wherein $MTS_{Total}$ comprises a target combined torque rate modifier of both the first and second axles, which s comprises $$\frac{PTS}{PTS+STS} \text{ or } \left(1 - \frac{STS}{PTS+STS}\right),$$

wherein PTS indicates a wheel torque response capability of the primary torque source, and wherein STS indicates a wheel torque response capability of the secondary torque source.

When one of the first and second torque requests, but not the other, is satisfiable, the relative variation may be dependent on the relationship: $MTS_{on} = MTS_{Total} - MTS_{off}$; wherein MTS refers to a torque rate modifier, wherein on refers to the one of the first and second torque sources meeting its corresponding first or second torque request, wherein off refers to the other of the first and second torque sources not meeting its corresponding first or second torque request, and wherein $MTS_{Total}$ comprises a target combined torque rate modifier of both the first and second axles.

In some examples, $$MTS_{off} = \min\left(xTS_{off}, MTS_{Total} - \frac{d(Tq_{on}^{Raw})}{dt}\right),$$

wherein $xTS_{off}$ indicates a wheel torque response capability of the off torque source, and wherein $$\frac{d(Tq_{on}^{Raw})}{dt}$$

indicates a rate of torque change provided by the on torque source.

When the first and second torque requests are changing in opposite directions and at least one of the corresponding torque requests is not satisfiable, the relative variation may be dependent on the relationship: $MTS_{INC}=-MTS_{DEC}$; wherein MTS refers to a torque rate modifier, wherein INC refers to the one of the first and second torque sources providing a positive rate of torque change, and wherein DEC refers to the other of the first and second torque sources providing a negative rate of torque change.

In some examples, $MTS_{INC}=-MTS_{DEC}=\min(|xTS_{INC}|, |yTS_{DEC}|)$, wherein $xTS_{INC}$ indicates a wheel torque response capability of the one of the first and second torque sources providing a positive rate of torque change, and wherein $yTS_{DEC}$ indicates a wheel torque response capability of the other of the first and second torque sources providing a negative rate of torque change.

The control system may be configured to enable a torque rate increase dependent on $$\frac{d(Tq^{DTS})}{dt},$$

from the one of the first and second torque sources having a faster wheel torque response capability than the other of the first and second torque sources, wherein $$\frac{d(Tq^{DTS})}{dt}$$

is indicative of a rate of change of the total torque request.

When both of the first and second torque requests are satisfiable, the total torque request, and/or the first and second torque requests, may be dependent on a drivability torque rate modifier, and wherein when at least one of the first and second torque requests is not satisfiable, the drivability torque rate modifier can be exceeded.

When both of the first and second torque requests are satisfiable, the modification of at least one of the torque requests may maintain a predetermined torque split between the first axle and the second axle, and when at least one of the first and second torque requests is not satisfiable, the modification of at least one of the torque requests enables a provided torque split to deviate from the predetermined torque split.

The control system may be configured to provide lash crossing protection to reduce a rate of torque change around a torque reversal, causing the provided torque to not meet its corresponding torque request during the torque reversal.

The control system may be configured to determine whether the first and second torque requests are satisfiable within an error threshold.

According to an aspect of the invention there is provided a system comprising the control system, the first torque source, and the second torque source.

In some examples, one of the torque sources comprises an electric machine, and wherein the other torque source comprises an internal combustion engine and, optionally, a further electric machine.

According to an aspect of the invention there is provided a vehicle comprising the system.

According to an aspect of the invention there is provided a method of controlling a total driven wheel torque for a vehicle by controlling torque output of a first torque source of the vehicle and of a second torque source of the vehicle, wherein the first torque source is configured to provide drive torque to a first axle of the vehicle for generating first axle wheel torque, wherein the second torque source is configured to provide drive torque to a second axle of the vehicle for generating second axle wheel torque, the method comprising: receiving a total torque request for total driven wheel torque; producing a first torque request for the first torque source and a second torque request for the second torque source, in dependence on the total torque request for the total driven wheel torque; and when at least one of the first and second torque requests is not satisfiable, modifying at least one of the first and second torque requests to enable a sum of the first axle wheel torque and the second axle wheel torque to approach or satisfy the total torque request, wherein the modification of at least one of the torque requests is controlled by at least one torque rate modifier configured to increase or decrease a rate of change of at least one of the torque requests.

According to an aspect of the invention there is provided computer software that, when executed, is arranged to perform the method. According to a further aspect of the invention there is provided a non-transitory computer readable medium comprising computer readable instructions that, when executed by a processor, cause performance of any one or more of the methods described herein.

The one or more controllers may collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to cause performance of the method.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
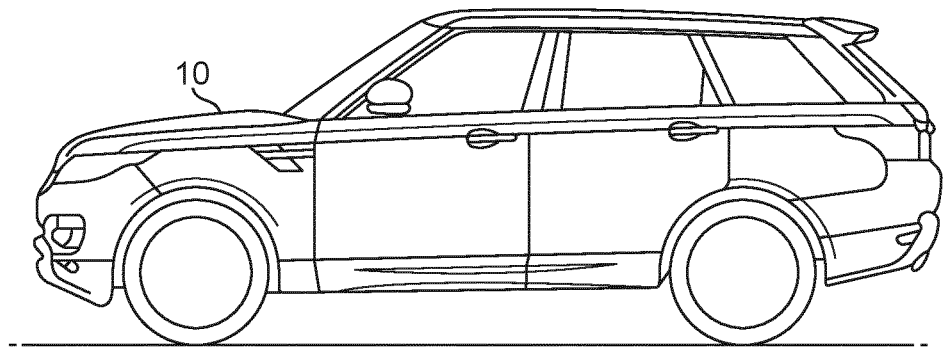
FIG. 1 illustrates an example of a vehicle.

FIG. 1 illustrates an example of a vehicle 10 in which embodiments of the invention can be implemented. In some, but not necessarily all examples, the vehicle 10 is a passenger vehicle, also referred to as a passenger car or as an automobile. In other examples, embodiments of the invention can be implemented for other applications, such as industrial vehicles.

The vehicle 10 comprises a plurality of torque sources. A torque source refers to a prime mover, such as an engine, an electric machine, or the like. The vehicle comprises a first torque source configured to provide torque to a first axle of the vehicle for generating first axle wheel torque. The vehicle further comprises a second torque source configured to provide torque to a second axle of the vehicle for generating second axle wheel torque.

The torque sources are different torque sources having different wheel torque response capabilities. A wheel torque response capability, or 'torque rate capability', defines a maximum rate at which the torque source can change its torque as measured at the vehicle wheels. The wheel torque response capability of a torque source depends on its machine torque response capability and on a selected gear reduction to the wheels. The gearing and the machine torque response capabilities may differ between the torque sources.

The machine torque response capability rate could depend on either a hardware-limited physical limit of the maximum rate of torque change, or a lower allowable limit. A machine torque response capability depends on variables such as an operating point of the torque source, such as its speed. An engine torque response capability tends to rise from a low value at low engine speeds, reaches a plateau, and then falls at high speeds. An electric machine torque response capability tends to be maximum at zero machine speed, followed by a plateau then a fall.

In some examples, one of the torque sources may comprise an engine and the other torque source may comprise an electric machine. An engine may have a slower torque response capability than an electric machine over some or all operating points.

Alternatively, both torque sources may comprise electric machines having different wheel torque response capabilities because the machine torque response capabilities are different, and/or because there is a different gear ratio between the torque source and the wheel.

In some examples, the vehicle 10 may be a hybrid electric vehicle (HEV). The vehicle 10 may be configured to operate as a parallel HEV. Parallel HEVs comprise a torque path between the engine and at least one vehicle wheel, as well as a torque path between an electric machine and at least one vehicle wheel. The torque path(s) may be disconnectable by a torque path connector such as a clutch or transmission. Typically, parallel HEVs differ from series HEVs, because in series HEVs the purpose of the engine is to generate electrical energy and there is no torque path between the engine and vehicle wheels. However, some types of parallel HEVs may be configurable to operate as a series HEV, such as 'through-the-road' hybrids. In this case we may usefully describe such a hybrid vehicle as operating in a parallel HEV mode or in a series HEV mode, depending on whether torque is being delivered from the engine directly to the vehicle wheels.

Figure 2:
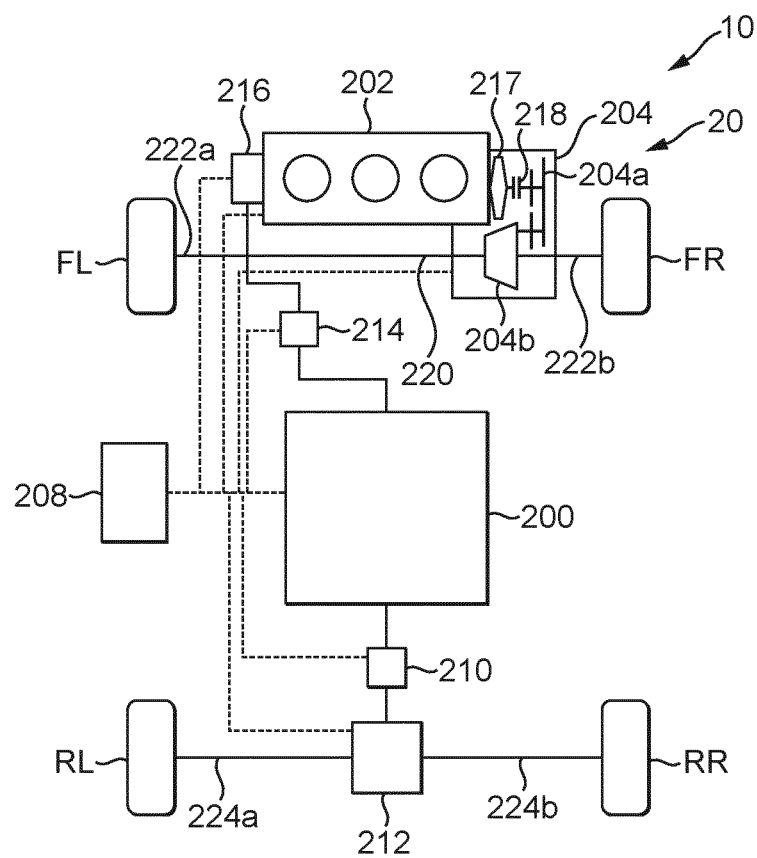
FIG. 2 illustrates an example of a system.

FIG. 2 illustrates an example system 20 for an HEV 10. The system 20 defines, at least in part, a powertrain of the HEV.

The system 20 comprises a control system 208. The control system 208 comprises one or more controllers. The control system 208 may comprise one or more of: a hybrid powertrain control module; an engine control unit; a transmission control unit; a traction battery management system; and/or the like.

The illustrated system 20 comprises an engine 202. The engine 202 is an internal combustion engine (ICE). The illustrated engine 202 comprises three combustion chambers, however a different number of combustion chambers may be provided in other examples.

The engine 202 is operably coupled to the control system 208 to enable the control system 208 to control output torque of the engine 202. The output torque of the engine 202 may be controlled by controlling one or more of: air-fuel ratio; spark timing; poppet valve lift; poppet valve timing; throttle opening position; fuel pressure; turbocharger boost pressure; and/or the like, depending on the type of engine 202.

The system 20 comprises a transmission 204 for receiving output torque from the engine 202. The transmission 204 may comprise an automatic vehicle transmission, a manual vehicle transmission, or a semi-automatic vehicle transmission. The transmission 204 may comprise one or more torque path connectors 218, a torque converter 217, and a gear train 204a. The gear train 204a is configured to provide a selected gear reduction in accordance with a selected gear of the vehicle 10. The gear train 204a may comprise five or more different selectable gear reductions. The gear train 204a may comprise at least one reverse gear and a neutral gear.

The system 20 may comprise a differential 204b which is a second gear train for receiving output torque from the gear train 204a. The differential 204b may be integrated into the transmission 204 as a transaxle, or provided separately.

The engine 202 is mechanically connected (coupled) or connectable (couplable) to provide positive torque to a first set of vehicle wheels (FL, FR) via a torque path 220. The torque path 220 extends from an output of the engine 202 to the transmission 204, then and then to first set of vehicle wheels (FL, FR) via a first axle or axles 222a, 222b. In a vehicle overrun and/or friction braking situation, negative torque may flow from the first set of vehicle wheels (FL, FR) to the engine 202.

The illustrated first set of vehicle wheels (FL, FR) comprises front wheels, and the axles 222a, 222b are front transverse axles. Therefore, the system 20 is configured for front wheel drive by the engine 202. In another example, the first set of vehicle wheels comprises rear wheels (RL, RR). The illustrated first set of vehicle wheels (FL, FR) is a pair of vehicle wheels, however a different number of vehicle wheels and axles could be provided in other examples.

In the illustrated system 20, no longitudinal (centre) driveshaft is provided, to make room for hybrid vehicle components. Therefore, the engine 202 is not connectable to a second set of rear wheels (rear wheels RL, RR in the illustration). The engine 202 may be transverse mounted to save space. In an alternative example, the engine 202 may be configured to drive the front and rear wheels.

A torque path connector 218 may be provided inside and/or outside a bell housing of the transmission 204. The torque path connector 218 is configured to connect and configured to disconnect the torque path 220 between the engine 202 and the first set of vehicle wheels (FL, FR). The torque path connector 218 may be a part of the torque converter 217 or gear train 204a, or may be a separate friction clutch. The system 20 may be configured to automatically actuate the torque path connector 218 without user intervention.

The system 20 comprises a first electric machine 216. The first electric machine 216 may be an alternating current induction motor or a permanent magnet motor, or another type of motor. The first electric machine 216 is located so that when the torque path 220 is disconnected from the first set of vehicle wheels (FL, FR), the first electric machine 216 is also disconnected. Alternatively, the first electric machine 216 may be located so that it remains connected to the first set of vehicle wheels (FL, FR).

The first electric machine 216 may be mechanically connected (coupled) or connectable (couplable) to the engine 202 via a belt or chain. For example, the first electric machine 216 may be a belt integrated starter generator (BISG). The first electric machine 216 and the engine 202 together form a torque source for the first set of vehicle wheels (FL, FR). In the illustration, the first electric machine 216 is located at an accessory drive end of the engine 202, opposite a vehicle transmission end of the engine 202. In an alternative example, the first electric machine 216 is a crankshaft integrated motor generator (CIMG), located at a vehicle transmission end of the engine 202. A CIMG may be capable of sustained electric-only driving unlike typical BISGs.

The first electric machine 216 is configured to selectively apply positive torque and configured to apply negative torque to a crankshaft of the engine 202, for example to provide functions such as: boosting output torque of the engine 202; facilitating the deactivating of (shutting off) the engine 202 while the vehicle is at a stop or coasting; activating (starting by cranking) the engine 202; generating power for ancillary loads; and/or regenerative braking in a regeneration mode. In a hybrid electric vehicle mode, the engine 202 and first electric machine 216 may both be operable to supply positive torque simultaneously to boost output torque. The first electric machine 216 may be incapable of sustained electric-only driving. In an alternative example, the first electric machine 216 is not controllable to provide positive torque other than to start the engine 202.

FIG. 2 illustrates a second electric machine 212, also referred to as an electric traction motor, configured to enable at least an electric vehicle mode comprising electric-only driving. Another term for the second electric machine 212 is an electric drive unit. In some, but not necessarily all examples, a nominal maximum torque of the second electric machine 212 is greater than a nominal maximum torque of the first electric machine 216.

Even if the torque path 220 between the engine 202 and the first set of vehicle wheels (FL, FR) is disconnected, the vehicle 10 can be driven in electric vehicle mode because the second electric machine 212 is mechanically connected to at least one vehicle wheel.

The illustrated second electric machine 212 is configured to provide torque to the illustrated second set of vehicle wheels (RL, RR). The second set of vehicle wheels (RL, RR) comprises vehicle wheels not from the first set of vehicle wheels (FL, FR). The illustrated second set of vehicle wheels (RL, RR) comprises rear wheels, and the second electric machine 212 is operable to provide torque to the rear wheels RL, RR via a second, rear transverse axle or axles 224a, 224b. Therefore, the illustrated vehicle 10 is rear wheel driven in electric vehicle mode. In an alternative example, the second set of vehicle wheels comprises at least one vehicle wheel of the first set of vehicle wheels. In a further alternative implementation, the second electric machine 212 is replaced with two electric machines, one for each rear vehicle wheel RL, RR.

The control system 208 may be configured to disconnect the torque path 220 between the engine 202 and the first set of vehicle wheels (FL, FR) in electric vehicle mode, to reduce parasitic pumping energy losses. For example, the clutch 218 may be opened. In the example of FIG. 2, this means that the first electric machine 216 will also be disconnected from the first set of vehicle wheels (FL, FR).

Another benefit of the second electric machine 212 is that the second electric machine 212 may also be configured to be operable in a hybrid electric vehicle mode, to enable multi-axle drive (e.g. all-wheel drive) operation despite the absence of a centre driveshaft.

In order to store electrical energy for the electric machines, the system 20 comprises an electrical energy storage means such as a traction battery 200. The traction battery 200 provides a nominal voltage required by electrical power users such as the electric machines.

The traction battery 200 may be a high voltage battery. High voltage traction batteries provide nominal voltages in the hundreds of volts. The traction battery 200 may have a voltage and capacity to support electric only driving for sustained distances. The traction battery 200 may have a capacity of several kilowatt-hours, to maximise range. The capacity may be in the tens of kilowatt-hours, or even over a hundred kilowatt-hours.

Although the traction battery 200 is illustrated as one entity, the function of the traction battery 200 could be implemented using a plurality of small traction batteries in different locations on the vehicle 10.

The first electric machine 216 and second electric machine 212 may be configured to receive electrical energy from the same traction battery 200 as shown.

Finally, the illustrated system 20 comprises inverters. Two inverters 210, 214 are shown, one for each electric machine. In other examples, one inverter or more than two inverters could be provided.

In an alternative implementation, the vehicle 10 may be other than shown in FIG. 2. For example, the first electric machine 216 may be connected through a clutch or gear to the engine 202, or may be located at the opposite end of the engine, possibly within the transmission 204 or on a driveshaft.

Figure 3A:
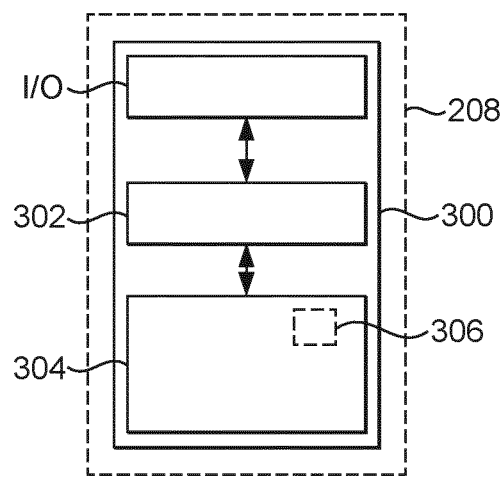
FIGS. 3A, 3B illustrate an example of a control system and of a non-transitory computer-readable storage medium.

FIG. 3A illustrates how the control system 208 may be implemented. The control system 208 of FIG. 3A illustrates a controller 300. In other examples, the control system 208 may comprise a plurality of controllers on-board and/or off-board the vehicle 10.

The controller 300 of FIG. 3A includes at least one processor 302; and at least one memory device 304 electrically coupled to the electronic processor 302 and having instructions 306 (e.g. a computer program) stored therein, the at least one memory device 304 and the instructions 306 configured to, with the at least one processor 302, cause any one or more of the methods described herein to be performed. The processor 302 may have an electrical input/output I/O or electrical input for receiving information and interacting with external components.

Figure 3B:
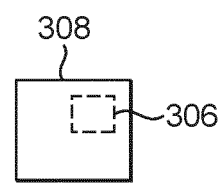

FIG. 3B illustrates a non-transitory computer-readable storage medium 308 comprising the instructions 306 (computer software).

Figure 4:
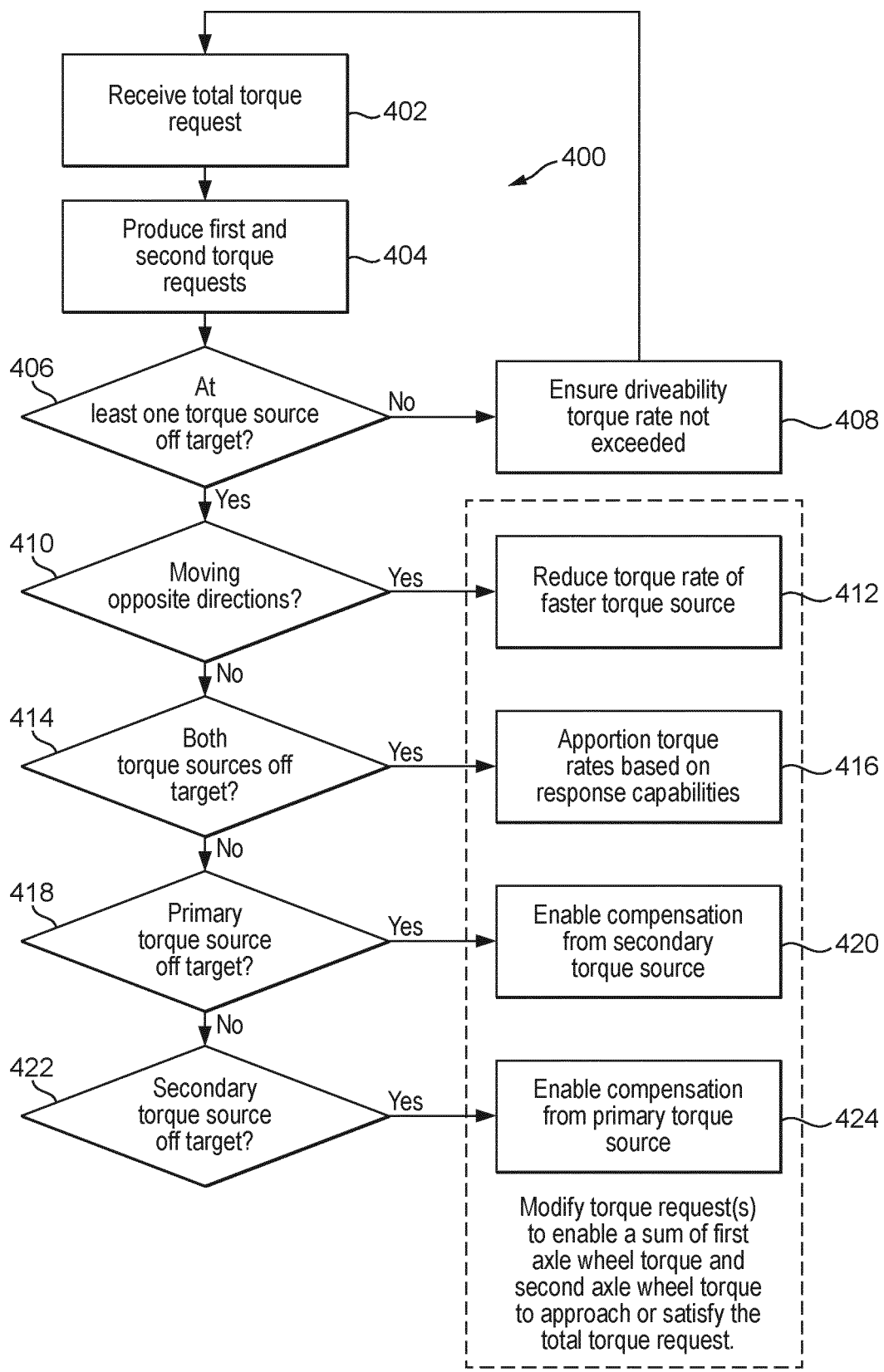
FIG. 4 illustrates an example of a method.

In accordance with an aspect of the invention, and as shown in the example of FIG. 4, there is provided a method 400 of controlling a total driven wheel torque for a vehicle by controlling torque output of a first torque source of the vehicle 10 and of a second torque source of the vehicle 10, wherein the first torque source is configured to provide drive torque to a first axle of the vehicle for generating first axle wheel torque, wherein the second torque source is configured to provide drive torque to a second axle of the vehicle for generating second axle wheel torque, the method 400 comprising:
- at block 402, receiving a total torque request for total driven wheel torque;
- at block 404, producing a first torque request for the first torque source and a second torque request for the second torque source, in dependence on the total torque request for the total driven wheel torque; and
- at blocks 406 to 424, when at least one of the first and second torque requests is not satisfiable, modifying at least one of the first and second torque requests to enable a sum of the first axle wheel torque and the second axle wheel torque to approach or satisfy the total torque request, wherein the modification of at least one of the torque requests is controlled by at least one torque rate modifier configured to increase or decrease a rate of change of at least one of the torque requests.

In an example implementation, the vehicle 10 may be as described in relation to FIG. 2. The first torque source comprises the engine 202 and optionally, an electric machine such as the first electric machine 216. The second torque source comprises an electric machine such as the second electric machine 212. Alternatively, the vehicle 10 may be an all-electric vehicle, and both torque sources may comprise electric machines.

Block 402 comprises receiving a total torque request for total driven wheel torque. A total torque request refers to a torque request that is in respect of the vehicle 10 and is not specific to one of the torque sources. Driven wheel torque refers to torque, both positive and negative, that is requested in the axle or wheel domain, rather than in the torque source domain. Therefore, the total torque request is indicative of the total desired force at the wheels of the vehicle 10. Driven wheel torque for a given axle is proportional to the torque provided by the torque source associated with that axle, the action of which may result in an acceleration or a deceleration of the rotational speed of the wheel as may be desired. Driven torque does not refer to torque applied by friction brakes.

Figure 5:
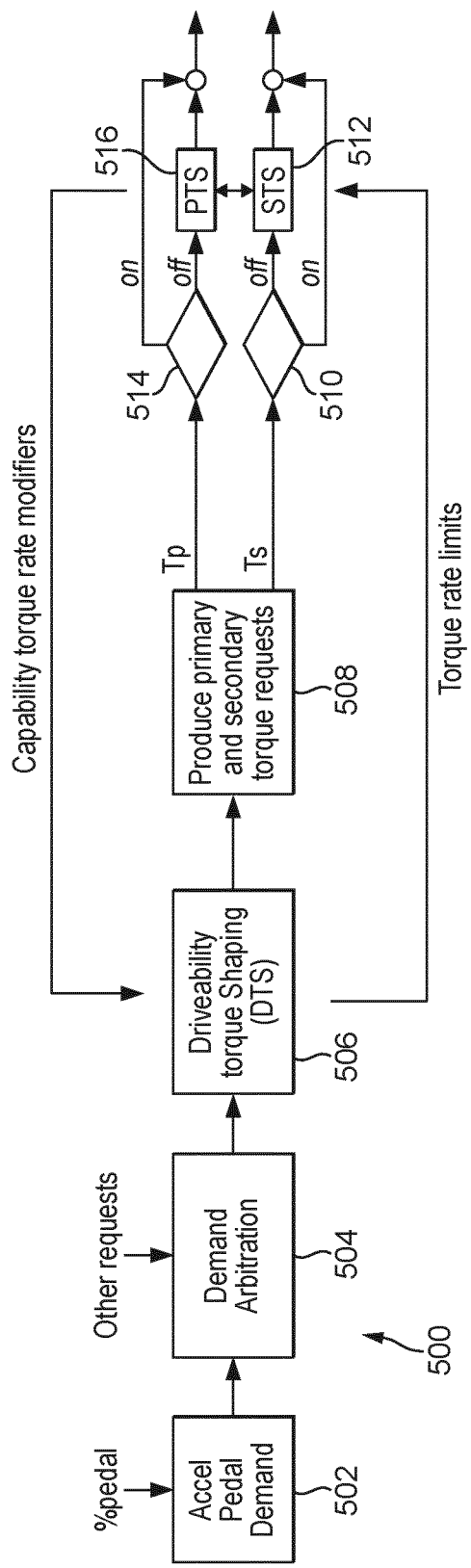
FIG. 5 illustrates an example flow diagram for the calculation of torque requests.

FIG. 5 illustrates an example of how the total torque request may be determined. FIG. 5 is a flow diagram 500 for torque requests. The flow diagram comprises an accelerator demand determining means 502 (determining module), a demand arbitration determining means 504, and a drivability torque shaping (DTS) determining means 506.

The accelerator demand determining means 502 is configured to determine at least a portion of the total torque request, in dependence on an input made by the user via a user operated control means such as an accelerator pedal, hand control lever, set+/set− switches, twist-grip or other suitable means. In an example, determining the accelerator demand may be in dependence on accelerator pedal depression.

The demand arbitration determining means 504 is configured to arbitrate the accelerator-dependent portion of the total torque request with other torque requests. An example of another torque request is a cruise control or advanced driver-assistance system (ADAS) torque request of known type. Arbitrating a plurality of torque requests may comprise combining the torque requests.

The drivability torque shaping determining means 506 is configured to receive the total torque request from the demand arbitration determining means 504. The drivability torque shaping determining means 506 comprises a function configured to shape (e.g. smooth) the received total torque request to produce a drivability-shaped total torque request.

The drivability torque shaping function of the total torque request may comprise a total drivability torque rate modifier. A torque rate modifier is a function configured to modify a rate of change of a torque request. The total drivability torque rate modifier modifies the rate of change of the total torque request, producing a drivability-shaped total torque request which applies to all downstream torque source torque requests. There are various ways of implementing a torque rate modifier, however one example comprises a torque rate limiter which determines whether the requested torque rate of change is greater than a predetermined limit value. If the predetermined limit value is exceeded, the torque limiter decreases the torque rate to the limit value. Increasing the limit value enables the torque rate to increase. Decreasing the limit value causes the torque rate to decrease. Drivability refers to the torque rate modifier being configured for comfort. For example, the limit value may be configured to limit a torque rate that is lower than a maximum torque rate, wherein the maximum torque rate depends on a wheel torque response capability of a torque source. A drivability torque rate modifier therefore reduces noise and vibration.

Referring back to the method 400, block 404 produces a first torque request for the first torque source and a second torque request for the second torque source, in dependence on the total torque request for the total driven wheel torque. The total torque request may be a drivability-shaped total torque request, having been shaped at block 506. The first and second torque requests may indicate torque required at the wheels or torque required by the torque sources.

Block 404 may be configured to determine the torque requests so that a sum of the first torque request and the second torque request adds up to the drivability-shaped total torque request.

The ratio between the first torque request and the second torque request may be fixed or variable. In some examples, the ratio depends on a predetermined torque split between the first axle and the second axle. The required torque split may be a ratio. The torque split in this example is a front:rear torque split, between torque at the front and rear axles. The required torque split helps to maintain all-wheel drive balance of the vehicle 10 (front-biased, rear-biased, or 50:50). In some examples, the required torque split may vary dynamically. The required torque split may depend on variables such as: a driving dynamics mode; a terrain mode and/or a terrain or surface type; vehicle speed; vehicle steering; lateral acceleration; and/or longitudinal acceleration; and/or other factors.

Block 404 corresponds to block 508 in FIG. 5, which comprises a first and second torque request determining means. The first and second torque request determining means 508 outputs a first torque request 'Tp' and a second torque request 'Ts'. The terms and 's' distinguish between which one of the torque sources is assigned as a primary torque source, and which one is a secondary torque source. Therefore, in another example the first torque request may be Ts and the second torque request may be Tp. The optional assignment of primary and secondary torque sources depends on a vehicle operating mode (e.g. electric vehicle mode, hybrid electric vehicle mode, internal combustion engine-only mode), or vehicle operating condition (e.g. creep assistance function, vehicle stability intervention function).

Equations (1) and (2) provide example functions for determining the first and second torque requests:

$$Tp = T \times Cp \times TS \quad (1)$$

$$Ts = T \times Cs \times (1-TS) \quad (2)$$

Tp is the primary torque request in a torque source frame of reference. Ts is the secondary torque request in a torque source frame of reference. T is the total torque request in the wheel frame of reference, which may be the drivability-shaped total torque request. Cp is the wheel-to-actuator gear ratio on the primary axle. Cs is the wheel-to-actuator gear ratio on the secondary axle. TS is the torque split, expressed as a number between 0 and 1 that determines the proportion of torque assigned to the primary torque source.

Figure 6:
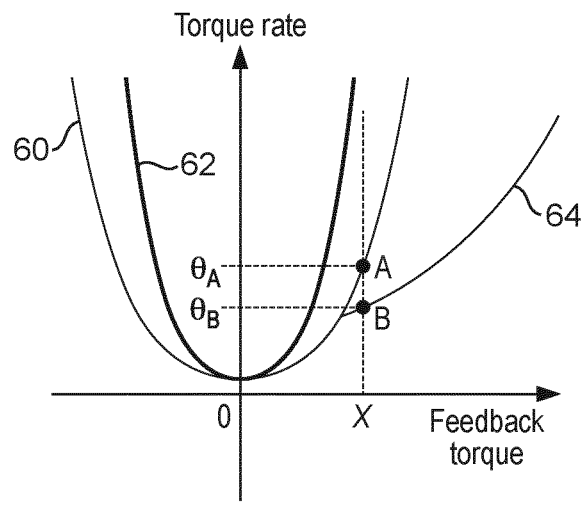
FIG. 6 illustrates an example graph of torque rate modifiers with respect to feedback torque.

The first and second torque requests may be individually shaped, for example by the primary and secondary torque shaping determining means 512, 516 of FIG. 5. FIG. 6 plots, among various functions, a drivability torque rate modifier function 64 for shaping the first or second torque request. The function 64 may be approximately the same for both the first and second torque requests. The y-axis comprises a limit value of a rate of change of torque. The x-axis comprises feedback torque.

As shown in FIG. 6, the drivability torque rate modifier function 64 may be a variable. The illustrated drivability torque rate modifier function 64 depends on feedback torque. The drivability torque rate modifier function 64 has a greater value for increasing feedback torque. Optionally, and as shown, the drivability torque rate modifier function 64 may be curved and increases in gradient for increasing magnitudes of the feedback torque.

The feedback torque is indicative of the first torque request and/or the second torque request, depending on which torque request is being shaped. The feedback torque is either the actual feedback torque from a torque source or the final request from the controller to the first or second torque sources. The feedback torque may be a torque request in absolute terms, rather than a relative error. Therefore, x=0 corresponds to a lash crossing region of torque reversal. In some examples, the feedback torque is in absolute terms but may be governed by a combination of a torque request and torque error. Torque error is in relative terms and indicates a difference between the unshaped torque request and the shaped torque request.

FIG. 6 further illustrates additional torque rate modifier functions. FIG. 6 illustrates a first capability torque rate modifier function 60 for one of the torque sources, and a second capability torque rate modifier function 62 for the other torque source. The functions 60, 62 are implemented by blocks 512, 516 depending on which torque source is a primary torque source and which is a secondary torque source.

A capability torque rate modifier is a torque rate modifier which depends on the wheel torque response capability of the respective torque source, at least by virtue of depending on the machine torque response capability of the respective torque source. Therefore, a capability torque rate modifier depends on a maximum allowable rate at which the torque source can change its torque. As mentioned earlier, the machine torque response capability may depend on the operating point of the torque source.

The first and second capability torque rate modifiers 60, 62 have a similar dependency on feedback torque as the drivability torque rate modifier 64, but increase with a steeper gradient for increasing feedback torque. Therefore, when feedback torque is high, a capability torque rate modifier enables a greater rate of torque change than a drivability torque rate limiter. However, the curves 60, 62, 64 may converge at low feedback torque as shown in FIG. 6. The line 64 diverges from line 60 (or 62) at a non-zero feedback torque. In the illustrated example, the drivability torque rate modifier 64 for a given feedback torque may be taken as the minimum of the rate from line 60, and the rate from the line 64.

Further, the capability torque rate modifiers are different from each other because the torque sources have different wheel torque response capabilities. For example, engines have lower wheel torque response capabilities than electric machines, therefore the capability torque rate modifier of the engine 202 could be represented by the line 60.

Although not shown, the torque rate modifiers 60, 62, 64 may depend on speed. For example, the capability torque rate modifiers 60, 62 may depend on the speeds of the respective torque sources. Therefore, the curves of FIG. 6 may be different at different speed slices.

FIG. 6 illustrates that for a given feedback torque of X, the drivability torque rate modifier implements a limit value OB of allowable torque rate to output a drivability-shaped torque request. For the given feedback torque X, the first capability torque rate modifier (e.g. of the engine 202) implements a greater limit value OA of allowable torque rate, to output a capability-shaped torque request.

Figure 7:
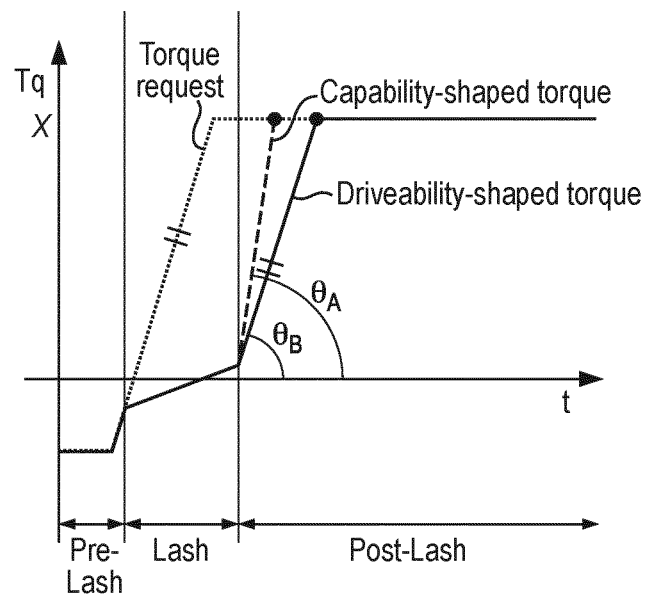
FIG. 7 illustrates an example graph of torque with respect to time.

The example torque-time graph of FIG. 7 plots a targeted first (or second) torque request as a dotted line, representing the feedback torque X in FIG. 6. The first torque request represents a target, dependent on accelerator control input. The dashed line and the solid line represent the shaped torque request provided to the torque source based on two different approaches described below. Both the dashed and solid lines indicate that the torque to be provided by the torque source becomes off-target, because of an intervention such as lash crossing protection (LCP). The delay occurs in the region marked 'Lash'.

A lash crossing is a zero-crossing point of torque, caused by a reversal of sign of torque. A torque reversal can provide a jolt or jerk as lost motion of mechanical components is taken up, therefore the role of lash crossing protection is to limit the allowable rate of change of torque from the torque source that is undergoing a lash crossing, to improve vehicle composure and durability. The lash crossing protection is typically restrictive when the feedback torque is within a predetermined range of zero. Lash crossing protection slows down the maximum rate of torque change of the torque source undergoing a lash crossing. After lash crossing protection, the torque of the torque source will be below-target and will need to catch up to the torque request. The lash crossing protection may be implemented at blocks 512 and 516 of FIG. 5, which apply the functions 60, 62, 64 of FIG. 6. Each of the functions 60, 62, 64 has a minimum rate at a feedback torque of x=0 (lash crossing). In FIG. 6, but not necessarily all examples, all three functions 60, 62, 64 have approximately the same minimum. At higher torques the functions 60, 62, 64 are less restrictive to varying extents.

The labelled 'lash' region in FIG. 7 is followed by a labelled 'post-lash' region in which the torque rate limit increases to enable the torque to reach the torque request quickly. In this circumstance, it would be desirable to increase the allowable post-lash torque rate limit to reduce the time that the torque source is off-target. However, allowing the post-lash torque rate limit of a torque source to increase at a very high rate without also controlling the torque rate limit of the other torque source can result in overall torque increasing too fast, causing transients in total torque relative to the total torque request. Therefore, careful control is required.

The solid line indicates a standard drivability-shaped first torque request. The long-dashed line indicates a higher-gradient capability-shaped first torque request, based on a capability torque rate modifier. Based on the gradients OA and OB of the drivability-shaped and capability-shaped torque requests, there is a clear potential time reduction for reaching the target, if the torque rates can be carefully controlled based on the capability torque rate modifier (lines 60/62 of FIG. 6).

In the following examples to be described, the torque rate is temporarily controlled based on the capability torque rate modifier when a torque request is not satisfiable.

Block 406 determines whether at least one of the first or second torque requests is not satisfiable. In other words, is at least one of the torque sources off-target?

In an example implementation, determining whether a torque request is not satisfiable comprises comparing the torque request with a shaped torque request to determine an error therebetween. The shaping may comprise applying the function 64 to provide lash crossing protection. Therefore, the control system 208 is configured to determine whether torque source-specific torque shaping of the first or second torque request will cause the respective torque source to lag behind its torque request. In this approach, but not necessarily all examples, the actual provided torque does not necessarily have to be measured in order to make the determination.

In an implementation, block 406 determines whether the first and second torque requests are satisfiable in dependence on an error threshold. In an example, the error threshold is at least approximately ±20 Nm when measured from a vehicle wheel frame of reference. The error can alternatively be expressed in a torque source frame of reference knowing the gear reduction between the torque source and the vehicle wheels. The error threshold may be the same or different for each torque source.

The determination of block 406 may be repeated for each of the torque sources, with respect to its corresponding torque request. If, for both torque sources, the error is less than the error threshold, both torque sources are regarded as on-target. If the difference is greater than the error threshold for one of the torque sources, at least one torque source is regarded as off-target.

In some examples, the determination of block 406 may comprise a prediction step, comprising predicting whether the torque requests will be satisfiable following a detected upcoming lash crossing.

If both torque sources are on-target, the method 400 proceeds to block 408 in which the first and second torque requests are not shaped as long as their drivability torque rate modifiers 64 are not exceeded. Therefore, the first and second torque requests remain dependent on the drivability-shaped total torque request in a ratio that satisfies the required torque split.

When a lash crossing occurs in a torque source, the drivability torque rate modifier 64 of block 512 or 516 will become restrictive as shown by the curve 64 in FIG. 6, which reaches a minimum at a lash crossing (feedback torque=0). This will cause the shaped torque request to become off-target relative to the unshaped torque request, which will cause the error threshold to be exceeded. Therefore, block 406 will determine that the torque source is off-target.

If at least one torque source is off-target, for example due to a lash crossing, then a sum of the first axle wheel torque and the second axle wheel torque no longer satisfies the total torque request. The method 400 modifies the manner in which at least one of the first and second torque requests Tp, Ts is shaped, in various examples described below. As shown in equation (3), the modifications are configured to ensure that a sum of the torque requests provided by the torque sources approach or satisfy the total torque request T:

$$T = Tp + Ts \quad (3)$$

This causes the determination of Tp and Ts to become inter-dependent. Further, the ratio Tp:Ts of the requests may be allowed to deviate from the required torque split.

The optimum modification strategy depends on which torque source is off-target. Therefore, the method 400 comprises, at blocks 410, 414, 418, 422, determining which one(s) of the torque sources is off-target. FIG. 5 includes corresponding target decision blocks 510 and 514 configured to implement the functionality of blocks 410, 414, 418 and 422. FIG. 5 then includes the primary and secondary torque shaping determining means 512, 516, configured to, with the drivability torque shaping determining means 506, implement the functionality of blocks 412, 416, 420 and 424 if at least one of the torque sources is off-target. Otherwise, blocks 512 and 516 may be bypassed.

In some, but not necessarily all examples, the primary and secondary torque shaping determining means 512, 516 may provide the drivability torque shaping determining means 506 with feedback indicating the capability torque rate modifiers 60, 62 of their respective torque sources. The drivability torque shaping determining means 506 can then make decisions based on the feedback, for example determining the torque rate limits for the individual torque sources (blocks 412, 416, 420, 424) compliant with equation (3), and providing those torque rate limits to the primary and secondary torque shaping determining means 512, 516 for implementation. The torque rate limits comply with equation (3) when their sum matches a predetermined value.

If just one of the torque sources is off-target, the method 400 performs block 420 or 424. If both of the torque sources are off-target, the method 400 performs block 416. If the torque requests are changing in opposite directions, the method 400 performs block 412, which is described first.

Figure 10:
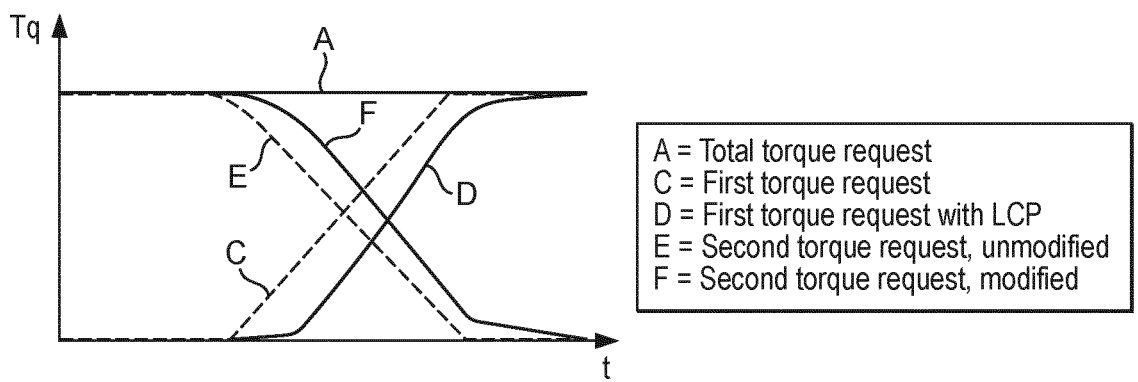
FIG. 10 illustrates an example graph of torque with respect to time, when torque requests change in opposite directions.

Block 410 comprises determining whether the first and second torque requests are changing in opposite directions (one has a positive rate, the other has a negative rate), and determining which one(s) of the torque sources is off target. FIG. 10 is a torque-time graph illustrating an example in which a torque source is off-target during a torque change in opposite directions. When a torque source becomes off-target in this scenario, it is difficult to satisfy equation (3) for the reasons discussed below.

The total torque request Tin this case is indicated by line A of FIG. 10. The total torque request is approximately constant in this example, so would be the same regardless of whether line A represents the unshaped total torque request or the drivability-shaped total torque request.

Line C represents a first torque request for a first torque source, such as an electric machine, without lash crossing protection and without consequent modified torque shaping. Line D represents how the first torque request would look with lash-crossing protection and with consequent modified torque shaping (block 412 of the method 400). During the lash crossing, the first torque source becomes off-target as determined in block 406.

Line E represents the unmodified second torque request for the second torque source, such as the engine 202. Line F represents the modified second torque request, with modified torque shaping (block 412 of the method 400).

If both torque sources are on-target, the sum of the lines C and E adds up to the total torque request. In FIG. 10, the second torque request of line E decreases in proportion to the increase of the first torque request of line C.

However, if the first torque request is reduced due to lash-crossing protection, line D becomes below-target relative to line C. If the second torque request follows line E without being modified, then the second torque request no longer decreases truly in proportion to the increase of the first torque request of line C. In other words, their sum (D+E) briefly deviates from the total torque request of line A. The torque of the second torque source is not falling rapidly enough to compensate for the slow increase in torque of the first torque source. This may result in a perceptible jerk or other disturbance in composure for the vehicle 10 occupants.

Therefore, the method 400 is configured to satisfy equation (3) by causing the torque rates of both torque sources to become inter-dependent. If one torque source becomes off-target, for example by undergoing lash, then the other torque source will slow down its response to maintain the total torque request. Equation (4) provides the following constraint on the torque rates:

$$MTS_{INC}=-MTS_{DEC} \quad (4)$$

MTS stands for 'modified torque shaping'. The subscript INC refers to the torque source providing increasing torque. The subscript DEC refers to the torque source providing decreasing torque.

A result of equation (4) is that the allowable rate of change of the on-target torque source is slowed to compensate for the slower increase of the off-target first torque source. Therefore, line E is modified into line F. Line F comprises a negative equivalent of the lash-crossing rate reduction in line D, even though the second torque source does not undergo a lash crossing. Line F is equal to line D subtracted from line A (equation (3)).

Once the off-target torque source is no longer undergoing lash but is still off-target, the method 400 enables an increased rate of torque change from both of the torque sources, wherein the rates are still inter-dependent to ensure that the total torque request is maintained. A capability-based rate would advantageously reduce the delay previously caused by the lash crossing. According to the example below, the rate of torque change for a given torque source may be dependent on the capability torque rate modifiers of both of the respective torque sources.

To ensure that the sum of the provided torques in the post-lash region matches the total torque request, block 412 of the method 400 comprises modifying at least one of the torque request(s) to cause a reduction of torque rate from the torque source having a faster wheel torque response capability. That is, the torque source having the faster wheel torque response capability is controlled using the slower wheel torque response capability of the other torque source. Equations (5) and (6) show the linked torque rates:

$$MTS_{INC}=\min(|xTS_{INC}|,|yTS_{DEC}|) \quad (5)$$

$$MTS_{DEC}=-\min(|xTS_{INC}|,|yTS_{DEC}|) \quad (6)$$

$xTS_{INC}$ indicates a wheel torque response capability of the one of the first and second torque sources providing increasing torque. The wheel torque response capability may be determined based on the function 60 or 62 plotted in FIG. 6. $yTS_{DEC}$ indicates a wheel torque response capability of the other of the first and second torque sources providing decreasing torque. Its wheel torque response capability may be determined based on the other function 62 or 60 plotted in FIG. 6. The minimization function ensures that both torque sources are locked to the slowest wheel torque response capability, to prevent the faster torque source from causing a torque overshoot.

As a result, the sum of modified lines D and F of FIG. 10 always add up to line A so there is no torque surge or undershoot. This improves comfort whenever the torque changes in opposite directions, for example when switching vehicle operating modes while moving by activating one torque source while the other is deactivated.

According to the above example and FIG. 10 it is assumed that the total torque request is a constant (line A) having zero rate of change, therefore, the sum of the torque rate modifiers $MTS_{INC}$ and $MTS_{DEC}$ should add to zero. However, in operation the total torque request may move arbitrarily. In this situation, the sum of the torque rate modifiers may be controlled to add up to the rate of change of the total torque request. Specifically, the method 400 may enable a torque increase from the torque source having a faster wheel torque response capability, in dependence on a rate of change of the total torque request. Equations (6) and (7) provide an example implementation:

$$MTS_{INC} = \min(|PTS_{INC}|, |STS_{DEC}|) + \frac{d(Tq^{DTS})}{dt} \text{ if } |PTS_{INC}| > |STS_{DEC}| \quad (6)$$

$$MTS_{DEC} = -\min(|PTS_{INC}|, |STS_{DEC}|) \quad (7)$$

$\frac{d(Tq^{DTS})}{dt}$ is indicative of the rate of change of the drivability-shaped total torque request. The superscript DTS means that the total torque request is a drivability-shaped total torque request. The 'if' statement ensures that the torque source having the fastest wheel torque response capability follows the changing total torque request. However, if $|PTS_{INC}|<|STS_{DEC}|$, then $$\frac{d(Tq^{DTS})}{dt}$$

is added to equation (7) instead. Equations (6) and (7) also distinguish between primary and secondary torque sources. $PTS_{INC}$ indicates a wheel torque response capability of the primary torque source providing the increasing torque. $STS_{DEC}$ indicates a wheel torque response capability of the secondary torque source providing the decreasing torque. Usually, during the vehicle 10 operating mode change, the torque source providing the decreasing torque would be 'secondary' because it is being deactivated. However, in some instances, the 'primary' and 'secondary' labels may be reversed.

Figure 8:
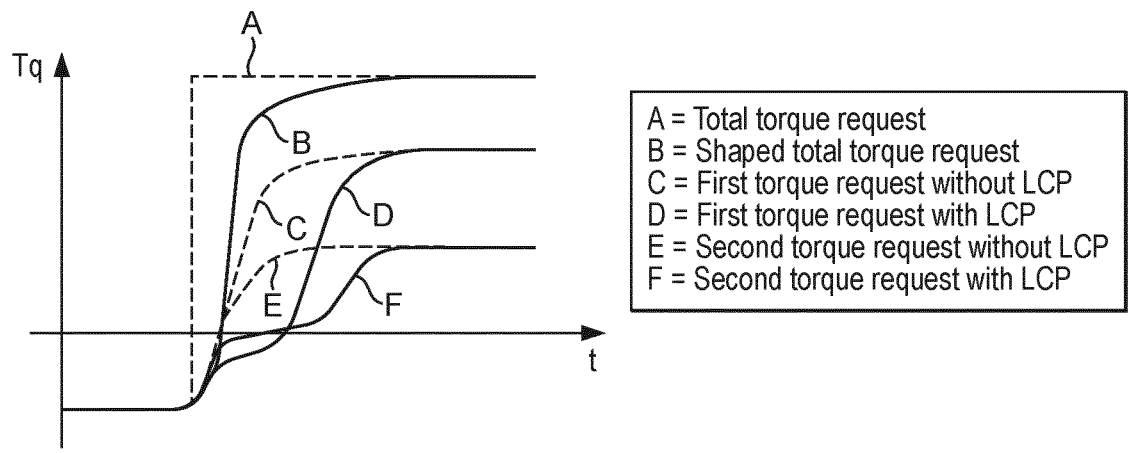
FIG. 8 illustrates an example graph of torque with respect to time, when both torque sources are off-target.

Referring back to the method 400, if block 410 determines that the rate of change of torques produced by the torque sources are not opposite, the method 400 proceeds to block 414 which determines whether both torque sources are off target. FIG. 8 is a torque-time graph illustrating an example in which both torque sources are off-target.

Line A of FIG. 8 indicates the total torque request which comprises a step-like increase. The total torque request is arbitrated but not shaped, and may be output by block 504 of FIG. 5. Line B indicates the drivability-shaped total torque request, which may be output by block 506 of FIG. 5. The drivability-shaped total torque request is smoother than line A and increases with a rate of change governed by line 64 of FIG. 6.

Line C of FIG. 8 is the unmodified first torque request without lash crossing protection and without modified torque shaping. Line E is the unmodified second torque request without lash crossing protection and without modified torque shaping. Lines C and E are on-target, their sum adds up to line B, and their ratio satisfies the required torque split.

When both torque sources are off-target, equation (3) is not satisfied. Lines D and F are the first and second torque requests, respectively, with lash crossing protection (off-target). The lash crossing regions are followed by an increased post-lash torque rate. Based on the example method described below, at least one of lines D and F may be allowed to increase more steeply than its corresponding line C and E.

Block 416 of the method 400 comprises apportioning the torque rate limits in dependence on the relative wheel torque response capabilities of the torque sources. This enables a relatively increased rate of torque change from the torque source having a greater wheel torque response capability, relative to the other, slower torque source. Equations (8), (9) and (10) provide an example implementation:

$$MTS_{Prim} = MTS_{Total} \times (s) \quad (8)$$

$$MTS_{Secnd} = MTS_{Total} \times (1-s) \quad (9)$$

$$\text{where } s = \frac{PTS}{PTS + STS} \quad (10)$$

MTS refers to modified torque shaping, in which the first and second torque requests are a function of feedback torque and wheel torque response capabilities (lines 60, 62) rather than drivability (line 64). The subscripts Prim and Secnd refer to the first and second torque sources as primary and secondary torque sources. $MTS_{Total}$ comprises a target combined torque rate modifier of both the first and second axles, which may be scaled for drivability. The term s refers to a splitting function, which divides the combined torque rate modifier between the torque sources in dependence on the wheel torque response capability PTS of the primary torque source, and in dependence on the wheel torque response capability of the secondary torque source STS.

Apportionment of rate limits based on the target combined torque rate modifier ensures that the first and second modified torque requests approach the total torque request in a smooth and consistent manner.

Referring back to the method 400, if fewer than both of the torque sources are off-target, the method 400 proceeds to blocks 418 and 422. Block 418 determines whether the first (e.g. primary) torque source is off-target. If not, block 422 determines whether the second (e.g. secondary) torque source is off-target.

If the primary torque source is off-target, block 420 enables the secondary torque source to provide compensation torque. If the secondary torque source is off-target, block 424 enables the primary torque source to provide compensation torque.

Compensation torque refers to requesting additional positive or negative torque from the on-target torque source based on equation (3), at a rate of change governed by equation (11) below:

$$MTS_{on} = MTS_{Total} - MTS_{off} \quad (11)$$

The subscript on identifies the torque source which is on-target, and the subscript off identifies the torque source with is off-target. MTS and $MTS_{Total}$ are as defined earlier.

Equations (12) and (13) provide an optional implementation configured to ensure that the compensation torque does not exceed the wheel torque response capability of the on-target torque source:

$$MTS_{off} = \min\left(xTS_{off}, MTS_{Total} - \frac{d(Tq_{on}^{Raw})}{dt}\right) \quad (12)$$

$$MTS_{on} = MTS_{Total} - \min\left(xTS_{off}, MTS_{Total} - \frac{d(Tq_{on}^{Raw})}{dt}\right) \quad (13)$$

$xTS_{off}$ indicates a wheel torque response capability of the off-target torque source.

$$\frac{d(Tq_{on}^{Raw})}{dt}$$

indicates the rate of change of the torque actually provided by the on-target torque source. The operation $$MTS_{Total} - \frac{d(Tq_{on}^{Raw})}{dt}$$

enables the provision of an increased torque rate greater than allowed by the drivability torque rate modifier 64, to satisfy the total torque request faster. The minimization function saturates the compensation torque request if the wheel torque response capability $xTS_{off}$ of the on-target torque source is exceeded. If the rate of the off-target torque source is saturated, then the on-target torque source can provide compensation torque.

Figure 9:
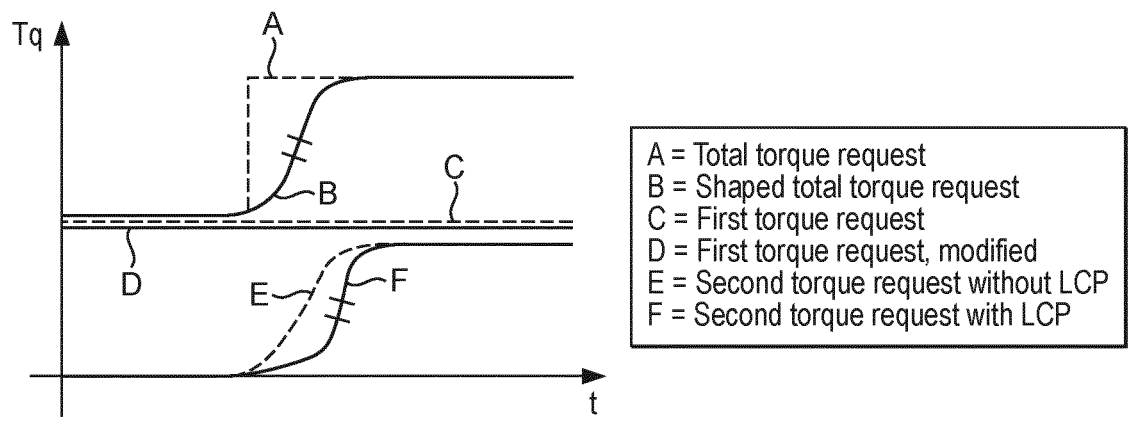
FIG. 9 illustrates an example graph of torque with respect to time, when one torque source is off-target.

FIG. 9 is a torque-time graph illustrating an example in which one torque source is off-target. Line A indicates the total torque request comprising a step-like increase. Line B indicates the drivability-shaped total torque request.

Line C represents the first torque request of the on-target torque source. In this example, but not necessarily all examples, the first torque source is requested to provide a constant torque. Line D represents the first torque request of the on-target torque source, with the modified torque shaping (block 420 or 424) controlled by equation (13), although in this case compensation torque is not required as line D remains parallel to line C. In some examples, the constant torque request of the first torque source may be zero.

Line E represents the second torque request without lash crossing protection (LCP), remaining on-target. The sum of the lines C and E adds up to the drivability-shaped total torque request of line B. Line F represents the second torque request including lash crossing protection and with the consequent modified torque shaping. Line F is off-target relative to line E due to lash crossing protection.

Equation (12) means that line F increases steeply in the post-lash region, at a greater gradient than allowed by the drivability torque rate modifier 64. Line F therefore increases more steeply than line E, in the post-lash region.

In the specific example of FIG. 9, no compensation torque is required from the first torque source. That is, the second torque source operates within its wheel torque response capability $xTS_{off}$. However, if the rate of the second torque request is saturated then equation (13) ensures that the first torque source can provide compensation torque, which would cause line D to deviate from line C.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in FIGS. 4 and 5 may represent steps in a method and/or sections of code in the computer program 306. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant reserves the right to claim protection in respect of any patentable feature or combination of features hereinbefore referred to and/or shown in the drawings whether or not particular emphasis has been placed thereon.

The invention claimed is:

1. A control system for controlling a total driven wheel torque for a vehicle by controlling torque output of a first torque source of the vehicle and of a second torque source of the vehicle, wherein the first torque source is configured to provide drive torque to a first axle of the vehicle for generating first axle wheel torque, wherein the second torque source is configured to provide drive torque to a second axle of the vehicle for generating second axle wheel torque, the control system comprising one or more controllers, wherein the control system is configured to:

receive a total torque request for total driven wheel torque;

produce a first torque request for the first torque source and a second torque request for the second torque source, in dependence on the total torque request for the total driven wheel torque;

determining whether the first torque request is not satisfiable by comparing the first torque request with a first shaped torque request to determine a first error therebetween, the first torque request being determined to be not satisfiable if the first error is greater than a first error threshold for the first torque source;

determining whether the second torque request is not satisfiable by comparing the second torque request with a second shaped torque request to determine a second error therebetween, the second torque request being determined to be not satisfiable if the second error is greater than a second error threshold for the second torque source; and when at least one of the first and second torque requests is not satisfiable modify at least one of the first and second torque requests to enable a sum of the first axle wheel torque and the second axle wheel torque to approach or satisfy the total torque request, wherein the modification of at least one of the torque requests is controlled by at least one torque rate modifier configured to increase or decrease a rate of change of at least one of the torque requests.

2. The control system of claim 1, wherein the modification of at least one of the torque requests comprises modifying the first torque request and modifying the second torque request.

3. The control system of claim 1, wherein the modification of at least one of the torque requests is in dependence on a wheel torque response capability of at least one of the first torque source and the second torque source.

4. The control system of claim 3, wherein one of the first and second torque sources has a faster wheel torque response capability than the other and when both the first and second torque requests are not satisfiable, the control system is configured to: control the modification of at least one of the first and second torque requests to enable an increased rate of torque change from the one of the first and second torque sources having a greater wheel torque response capability, relative to the other of the first and second torque sources.

5. The control system of claim 3, wherein one of the first and second torque sources has a faster wheel torque response capability than the other and when one of the first and second torque requests, but not the other, is satisfiable, the control system is configured to: control the modification of at least one of the torque requests to enable an increased rate of torque change from the one of the first and second torque sources that satisfies its corresponding torque request.

6. The control system of claim 3, wherein one of the first and second torque sources has a faster wheel torque response capability than the other, and when the first and second torque requests are changing in opposite directions and at least one of the corresponding torque requests is not satisfiable, the control system is configured to: control the modification of at least one of the torque requests to cause a reduction of torque rate from the torque source having a faster wheel torque response capability.

7. The control system of claim 1, wherein the at least one torque rate modifier comprises a first torque rate modifier for the first torque source and a second torque rate modifier for the second torque source.

8. The control system of claim 7, wherein controlling a torque shaping function comprises enabling relative variation of the first torque rate modifier and the second torque rate modifier.

9. The control system of claim 8, wherein one of the first and second torque sources has a faster wheel torque response capability than the other and when both of the first and second torque requests are not satisfiable, the relative variation is dependent on the relationship:

$$MTS_{Prim}=MTS_{Total}\cdot(s); \text{ and}$$

$$MTS_{Secnd}=MTS_{Total}\cdot(1-s);$$

wherein MTS refers to a torque rate modifier, wherein Prim refers to a primary one of the first and second torque sources, wherein Secnd refers to a secondary one of the first and second torque sources, wherein $MTS_{Total}$ comprises a target combined torque rate modifier of both the first and second axles, wherein s comprises $$\frac{PTS}{PTS+STS} \text{ or } \left(1-\frac{STS}{PTS-STS}\right),$$

wherein PTS indicates a wheel torque response capability of the primary torque source, and wherein STS indicates a wheel torque response capability of the secondary torque source.

10. The control system of claim 8, wherein one of the first and second torque sources has a faster wheel torque response capability than the other and when one of the first and second torque requests, but not the other, is satisfiable, the relative variation is dependent on the relationship:

$$MTS_{on}=MTS_{Total}-MTS_{off};$$

wherein MTS refers to a torque rate modifier, wherein on refers to the one of the first and second torque sources meeting its corresponding first or second torque request, wherein off refers to the other of the first and second torque sources not meeting its corresponding first or second torque request, and wherein $MTS_{Total}$ comprises a target combined torque rate modifier of both the first and second axles.

11. The control system of claim 8, wherein one of the first and second torque sources has a faster wheel torque response capability than the other, and when the first and second torque requests are changing in opposite directions and at least one of the corresponding torque requests is not satisfiable, the relative variation is dependent on the relationship:

$$MTS_{INC}=-MTS_{DEC};$$

wherein MTS refers to a torque rate modifier, wherein INC refers to the one of the first and second torque sources providing a positive rate of torque change, and wherein DEC refers to the other of the first and second torque sources providing a negative rate of torque change.

12. The control system of claim 11, configured to enable a torque rate increase dependent on $$\frac{d(Tq^{DTS})}{dt},$$

from the one of the first and second torque sources having a faster wheel torque response capability than the other of the first and second torque sources, wherein $$\frac{d(Tq^{DTS})}{dt}$$

is indicative of a rate of change of the total torque request.

13. The control system of claim 1, wherein when both of the first and second torque requests are satisfiable, the total torque request, and/or the first and second torque requests, is dependent on a drivability torque rate modifier, and wherein when at least one of the first and second torque requests is not satisfiable, the drivability torque rate modifier can be exceeded.

14. The control system of claim 1, wherein when both of the first and second torque requests are satisfiable, the modification of at least one of the torque requests maintains a predetermined torque split between the first axle and the second axle, and when at least one of the first and second torque requests is not satisfiable, the modification of at least one of the torque requests enables a provided torque split to deviate from the predetermined torque split.

15. The control system of claim 1, wherein the control system is configured to provide lash crossing protection to reduce a rate of torque change around a torque reversal, causing the provided torque to not meet its corresponding torque request during the torque reversal.

16. A system comprising the control system of claim 1, the first torque source, and the second torque source.

17. A vehicle comprising the system of claim 16.

18. A method of controlling a total driven wheel torque for a vehicle by controlling torque output of a first torque source of the vehicle and of a second torque source of the vehicle, wherein the first torque source is configured to provide drive torque to a first axle of the vehicle for generating first axle wheel torque, wherein the second torque source is configured to provide drive torque to a second axle of the vehicle for generating second axle wheel torque, the method comprising:
- receiving a total torque request for total driven wheel torque;
- producing a first torque request for the first torque source and a second torque request for the second torque source, in dependence on the total torque request for the total driven wheel torque;
- determining whether the first torque request is not satisfiable by comparing the first torque request with a first shaped torque request to determine a first error therebetween, the first torque request being determined to be not satisfiable if the first error is greater than a first error threshold for the first torque source;
- determining whether the second torque request is not satisfiable by comparing the second torque request with a second shaped torque request to determine a second error therebetween, the second torque request being determined to be not satisfiable if the second error is greater than a second error threshold for the second torque source; and
- when at least one of the first and second torque requests is not satisfiable, modifying at least one of the first and second torque requests to enable a sum of the first axle wheel torque and the second axle wheel torque to approach or satisfy the total torque request, wherein the modification of at least one of the torque requests is controlled by at least one torque rate modifier configured to increase or decrease a rate of change of at least one of the torque requests.

19. A non-transitory, computer-readable memory storing computer software that, when executed, is arranged to perform a method according to claim 18.

20. A control system for controlling a total driven wheel torque for a vehicle by controlling torque output of a first torque source of the vehicle and of a second torque source of the vehicle, wherein the first torque source is configured to provide drive torque to a first axle of the vehicle for generating first axle wheel torque, wherein the second torque source is configured to provide drive torque to a second axle of the vehicle for generating second axle wheel torque, the control system comprising one or more controllers, wherein the control system is configured to:
- receive a total torque request for total driven wheel torque;
- produce a first torque request for the first torque source and a second torque request for the second torque source, in dependence on the total torque request for the total driven wheel torque; and
- when at least one of the first and second torque requests is not satisfiable modify at least one of the first and second torque requests to enable a sum of the first axle wheel torque and the second axle wheel torque to approach or satisfy the total torque request, wherein the modification of at least one of the torque requests is controlled by at least one torque rate modifier configured to increase or decrease a rate of change of at least one of the torque requests;
- the at least one torque rate modifier comprises a first torque rate modifier for the first torque source and a second torque rate modifier for the second torque source;
- wherein controlling a torque shaping function comprises enabling relative variation of the first torque rate modifier and the second torque rate modifier;
- wherein a sum of torque rate limits specified by the first torque rate modifier and the second torque rate modifier is configured to match a target combined torque rate modifier to enable the sum of the first axle wheel torque and the second axle wheel torque to approach or satisfy the total torque request.

* * * * *